Nov. 6, 1962 S. D. WHITE 3,062,921

PRESET CALL TRANSMITTER

Filed Dec. 15, 1960 2 Sheets-Sheet 1

INVENTOR
S. D. WHITE
BY V. P. Priolo
ATTORNEY

Nov. 6, 1962 S. D. WHITE 3,062,921

PRESET CALL TRANSMITTER

Filed Dec. 15, 1960 2 Sheets-Sheet 2

INVENTOR
S. D. WHITE
BY V. P. Briolo

ATTORNEY

United States Patent Office 3,062,921
Patented Nov. 6, 1962

3,062,921
PRESET CALL TRANSMITTER
Samuel D. White, Edison, N.J., assignor to Bell Telephone Laboratories, Incorporated, New York, N.Y., a corporation of New York
Filed Dec. 15, 1960, Ser. No. 76,039
7 Claims. (Cl. 179—90)

This invention relates to telephone substation apparatus and, more particularly, to preset call transmitters.

The development of electronic and other types of fast operating switching systems for the telephone industry has required new developments in telephone substation apparatus to utilize fully the many advantages and features of such switching systems. In this connection, various improvements have been made in substation apparatus generating multifrequency signals to reduce their signaling time.

Experience has indicated that a preset call transmitter adapted to generate multifrequency signals can be designed to have a signaling time which substantially approximates the operating time of the new switching systems. A preset call transmitter provides numerous advantages. It shortens the interval of time required to place a call and thereby makes it possible to handle a greater number of calls with less switching equipment. It reduces dialing errors since a visible check can be made of the called number before it is transmitted.

An object of the present invention is a preset call transmitter for multifrequency signaling.

Another object is a preset call transmitter adapted to display a telephone number and simultaneously define mechanically each digit of the telephone number in a coding system, typically a two-out-of-five code.

A specific object is a compact preset call transmitter which translates sequentially a telephone number encoded in mechanical form into multifrequency signals corresponding to the mechanically encoded telephone number.

These objectives are achieved by the present invention, one illustrative embodiment of which comprises a plurality of manually controlled selectors or number wheels for displaying a subscriber number desired to be called, each of said selectors being adapted to define mechanically any number from zero to nine in a coding system, typically a two-out-of-five coding system. A multifrequency signal generator including a plurality of tapped connections for producing discrete signals has access to said selectors through an array of conductors. The number wheels are rotatable on a fixed shaft and include internal cam surfaces. Followers ride on the cam surfaces and select junctions on a printed circuit board matrix connected to the signal generator, the discrete signals being determined by the positions of the selectors which display the telephone number to be called. The selection process involves connecting an individual signal generator frequency tap to an individual or separate horizontal conductor of the matrix and connecting each follower to an individual vertical conductor of the matrix, the followers being adapted to interconnect the vertical and horizontal conductors which are on opposite sides of the printed circuit board. A manually operated mechanical motor drives switching means which scans the selected junctions and connects the signal generator to the telephone line to transmit sequentially output signals determined by the positions of the junction selectors.

A feature of the present invention resides in means comprising a plurality of selectors or number wheels which cooperate with a multifrequency oscillator circuit to select at least two oscillator frequencies for each selector, the frequency combination uniquely defining each position of the selectors.

Another feature resides in means for providing a plurality of selectors with common access to a multifrequency oscillator circuit and sequentially connecting said selectors to said oscillator circuit.

Still another feature resides in means for intermittently connecting a multifrequency oscillator to a telephone line while a subscriber number mechanically encoded is translated one digit at a time into multifrequency electrical signals corresponding to the mechanically encoded subscriber numbers.

The nature of the invention and its distinguishing features and advantages will be more clearly understood from the following detailed description and the accompanying drawings in which.

Figure 1:
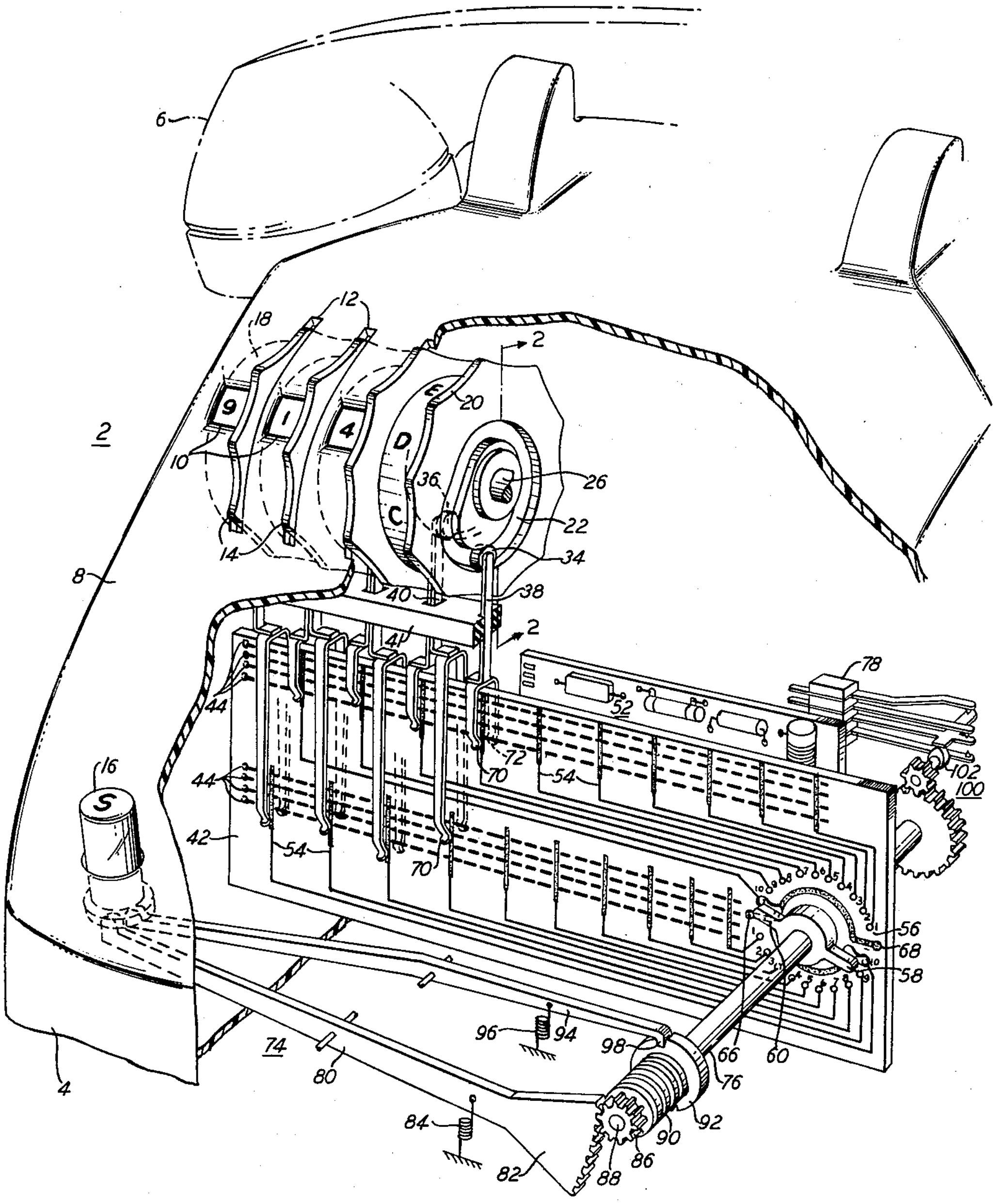
FIG. 1 is a view in perspective of a telephone set with portions broken away to show the preset calling mechanism and selectors included therein.

As shown in FIG. 1, a telephone set 2 incorporating the present invention includes a base 4 and a handset 6 joined by the usual handset cord (not shown) and connected to a telephone line TL (see FIG. 4) by a line cord (not shown). The speech elements of the set 2 are all of a conventional type well known to the art. On the sloping front wall 8 of the base are elongated openings 10 having a plurality of side branches 12 through which segments of ten digit wheels or selectors 14 protrude. The number of digit wheels is not necessarily limited to ten, but may be more or less depending upon the number of digits desired to be transmitted. Ten digit wheels have been selected for reasons of convenience only and since the nationwide numbering plan is ordinarily based on ten digits.

The base of the telephone set also includes a pushbutton 16 labeled with the indicia S, indicative of the word "send". As explained hereinafter, the pushbutton is used to initiate the actual calling signal transmission after setting up the numbers on the digit wheels.

Figure 2:
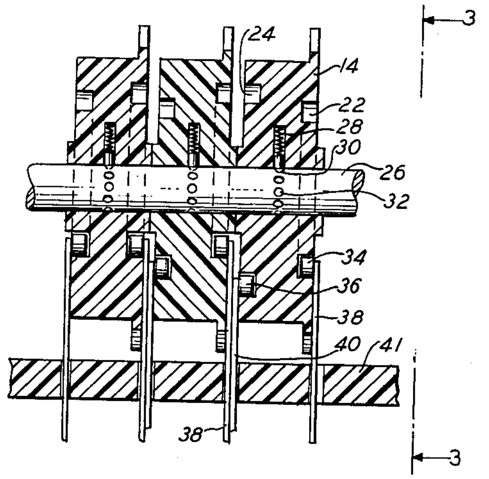
FIG. 2 is a sectional view taken on the line 2—2 of FIG. 1.
Figure 3:
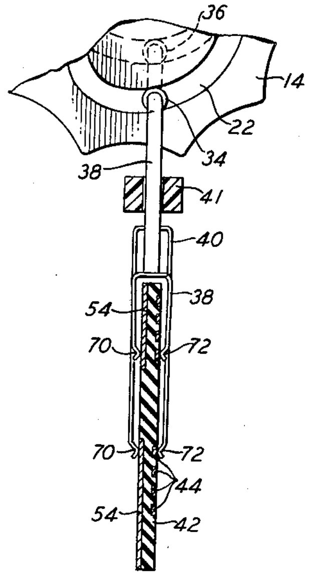
FIG. 3 is a sectional view taken on the line 3—3 of FIG. 2.

Each digit wheel 14 includes a drum portion 18 upon which are imprinted a plurality of indicia, a flange portion having a plurality of concave finger recesses 20, and two cam tracks 22 and 24. Cam track 22 is cut or molded into the flange portion while cam track 24 is cut or molded into the drum portion (see FIG. 2). The rotatable wheels 14 are disposed along a stationary shaft 26 suitably mounted within the base. Each wheel is locked in the selected position by an individual detent mechanism comprising a spring 28 and ball 30 disposed in the drum in such manner as to ride on the shaft, and a cooperating recessed portion 32 in the shaft. Cylindrical cam followers 34 and 36 ride cam tracks 22 and 24, respectively, thereby positioning U-shaped contact members 38 and 40 (as described hereinafter) in accordance with the desired digit and number-frequency code. The direction of travel of contact members 38 and 40 is controlled by guide bar 41 which is suitably mounted within the base.

Cooperating with each selector wheel and its associated contact members is a conductor array disposed on a printed wiring board 42. Longitudinal conductor tracks 44 on the back of the board, shown dotted in FIG. 1, connect to individual taps on windings 244 and 246 of oscillator 52 shown in FIG. 4. Leads 54 on the front of the board, shown solid in FIG. 1, terminate in a two gang switch 56 having the same number of active points as there are digit wheels. The contacts of this switch may be an integral part of the printed wiring board 42 with the two insulated wipers 58 and 60 being connected to capacitors 248 and 250 of oscillator 52 (FIG. 4) through conductors 66 and 68 (FIG. 1). The printed wiring board 42 is straddled by the U-shaped contact members 38 and 40 each of which has two individual contact wipers 70 and 72 which wipe the front and back of the board, respectively, to connect an individual lead 54 with a selected horizontal conductor 44.

Also cooperating with the selector assembly is a manually operated mechanical motor 74 controlled by pushbutton 16 and adapted to drive an auxiliary shaft 76 which actuates wipers 58 and 60 of selector switch 56, and switch 78 for properly connecting the oscillator 52 to the telephone circuit (not shown). Beneath the pushbutton 16, which is mounted within the base of the telephone set, is an arm 80 pivoted about an axis and carrying a sector gear 82. The arm 80 is attached to one end of a tension spring 84 used for returning the arm and pushbutton to the normal or rest position. Tension spring 84 may be identified as the motor spring since energy stored therein is used for the operation of the calling mechanism. Mating with sector gear 82 is a spur gear 86 on shaft 88 which is coupled to shaft 76 by a band clutch 90 of a type well known to the art which allows free movement of the driving member (shaft 88) in one direction and positive connection between the driving and driven (shaft 76) during rotation in the opposite direction. Shaft 76 carries a notched collar 92 which cooperates with a detent member 94. Detent member 94 is pivoted about an axis substantially parallel to that of arm 80 and is biased against collar 92 by a suitable spring member 96. Detent 98 in either of the oppositely disposed notches of collar 92 (fixed on shaft 76) prevents any rotation of shaft 76 until the end of the depression stroke of pushbutton 16, acting through lever 94, releases it. Detent 98 then permits only one half revolution of shaft 76 when the release of pushbutton 16 allows spring 84 through sector gear 82 and clutch 90 to drive shaft 76. A flyball governor of a type well known to the art (not shown) may be geared to shaft 76 to control its speed of rotation.

Figure 4:
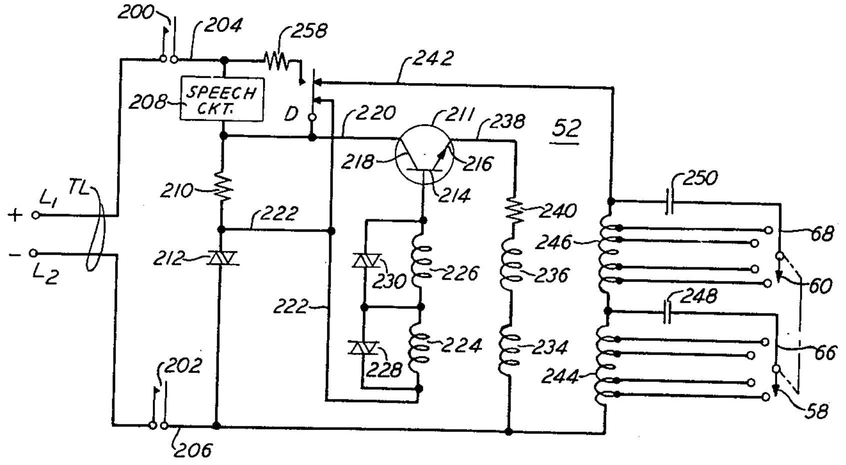
FIG. 4 is an electrical schematic representation of the signaling or oscillating circuit of the telephone set shown in FIG. 1.

Coupled to shaft 76 through a conventional speed increasing gear assembly 100 is the cam operated switch 78 which includes a cam member 102 driven by the assembly 100 to provide the functions of the transfer switch D shown in FIG. 4. The mechanical design of the cam operated switch is such that wipers 58 and 60 will complete the signal frequency determining circuits selected by an individual digit wheel prior to the operation of switch D (FIG. 4). Upon the operation of switch D, the selected dual-frequency signal is generated and transferred over line TL to the telephone central office. Switch D may return to its normal position during the interval that wipers 58 and 60 are not engaging contact points connected to leads 54. At the completion of a half revolution of shaft 76, all of the digits set up by the selecting mechanism will have been transmitted.

The digit wheel, selecting mechanism and shaft assemblies cooperate with a signaling circuit to translate the subscriber number displayed on the digit wheels and encoded in mechanical form into electrical signals. The signaling circuit shown in FIG. 4 is for two-out-of-five frequency signaling. It is understood, of course, that the present invention has application to other signaling systems as, for example, a one-out-of-ten frequency signaling system.

The signaling circuit includes a pair of switch-hook contacts 200 and 202 each connecting the telephone set to the telephone line TL. The set is connected to the switchhook contacts by a pair of conductors 204 and 206. Bridged across the conductors 204 and 206 is the entire speech circuit 208 of the telephone set in series with a resistor 210 and a voltage limiting symmetrical diode 212. The speech circuit is of conventional design and well known to any worker skilled in the telephone art.

A transistor 211 includes a base electrode 214, an emitter electrode 216 and collector electrode 218, the emitter-collector circuit thereof being effectively connected across the diode 212. The base and collector electrodes have a bias voltage thereon equal to the voltage drop across the diode 212. The connection of the collector 218 to the diode 212 is through the first set of normally closed contacts of a transfer switch D and conductors 220 and 222. The base electrode 214 is connected to the bias diode 212 through the same conductor 222 and a pair of series windings or coils 224 and 226 which are respectively shunted by voltage limiting diodes 228 and 230. The emitter electrode is connected to the line conductor 206 by a pair of windings or coils 234 and 236, a conductor 238 and a dropping resistor 240. A branch circuit extending through conductor 242 and the second set of normally closed contacts of the transfer switch D includes a pair of windings or coils 244 and 246 in series and terminates at the line conductor 206. The windings or coils 224, 234 and 244 are all on a common core and inductively coupled together. The windings or coils 226, 236 and 246 are similarly on a single core and coupled to each other. Each of the coils 244 and 246 includes five tapped connections, one of which includes series capacitors 248 and 250, respectively. Wipers 58 and 60 are arranged to connect the capacitors 248 and 250 across sections of the coils 244 and 246, respectively.

The circuit is shown in the normal nonsignaling condition with the speech circuit in condition for enablement upon the lifting of the handset and closure of switchhook contacts 200 and 202. In the arrangement shown, upon the closure of the switchhook contacts 200 and 202, direct current flows from the central office battery (not shown) to the speech circuit 208 thence to the transfer switch D by way of the conductor 220 and thereafter returning to the battery by way of the conductor 206 after passage through the coils 244 and 246 and the conductor 242. Direct current also flowing from the speech circuit establishes a common voltage on the base electrode 214 and the collector electrode 218 by way of the coils 224 and 226, the transfer switch D and the conductor 220.

Upon operation of the preset call mechanism or signal control means the wipers 58 and 60 are arranged for successive connection to selected taps of the coils 244 and 246 in accordance with the settings of the digit wheels. Af er the connection of the wipers to a set of selected taps the direct current path to the coils through the transfer switch D is interrupted thereby producing discharge between the coil 244 and the associated capacitor 248 and a similar discharge between the coil 246 and the associated capacitor 250. This discharge is inductively coupled to both the base and emitter circuits of the transistor through the mutual coupling between the respective coils. At the time of operation of the transfer switch D, the opening of the second front contact allows the voltage on the collector electrode to rise by an amount equal to the voltage across the resistor 210 thereby conditioning the transistor for amplification. The closure of the back contact of the transfer switch D provides a low impedance shunt through conductor 220 and a resistor 258 across the speech circuit in order to eliminate any interference for signaling by the speech circuit.

The energy in the tapped coils 244 and 246 coupled to both the emitter and base circuits of the transistor is amplified therein and introduced onto the telephone line through the resistor 258, the back contact of transfer switch D, and conductor 220. The frequency of the amplified oscillation is determined by the closed taps of the coils and the amplitude is limited by the shunting diodes 228 and 230 appearing across coils 226 and 224, respectively.

The signaling circuit may be characterized as a dual frequency transistor oscillator which is shock-excited into oscillation by the simultaneous discharge of the two tuned circuits and having the amplitude of both discharges limited so as to prevent one frequency from dominating the other.

The signal generator circuit is controlled by the preset call mechanism which is adapted to arrange bridging contacts for closing selected taps on the tuning coils of the oscillator in accordance with the numbers appearing on the digit wheel. The preset mechanism is also adapted to scan the bridging contacts in a properly timed sequence and operate and restore the D transfer switch in the proper phase.

It is to be understood that the above-described arrangements are illustrative of the application of the principles of the invention. Other arrangements may be devised by those skilled in the art without departing from the spirit and scope of the invention.

What is claimed is:

1. A preset telephone calling mechanism comprising a plurality of manually controlled selectors for establishing the digits of a telephone number to be called, a signal generator including a plurality of individual tuning circuits, said tuning circuits each comprising a respective one of a group of individual terminals and a common terminal, each of said individual terminals when connected to said common terminal producing a discrete frequency, a first array of conductors each connected to a respective one of said individual terminals, a switch comprising a wiper member and at least the same number of active contact members as the number of said selectors, said wiper member being connected to said common terminal, a second array of conductors each connected to a respective one of said switch contact members, individual means actuated by each of said selectors for bridging the particular conductors of said first and second arrays corresponding to the digits established by said selectors, motor means, means actuated by said motor means for causing said wiper member to scan sequentially said switch contact members to successively connect the common terminal of said tuning circuits to the individual terminals thereof selected in accordance with the setting of said selectors.

2. A preset telephone call transmitting system comprising a telephone line, a source of potential, a telephone set, said telephone set comprising a plurality of manually controlled selectors for establishing the digits of a telephone number to be called, a signal generator including output means and a plurality of individual tuning circuits, said tuning circuits each comprising a respective one of a group of individual terminals and a common terminal, each of said individual terminals when connected to said common terminal producing a discrete frequency, a first array of conductors each connected to a respective one of said individual terminals, a first switch, a second switch comprising a wiper member and at least the same number of active contact members as the number of said selectors, said wiper member being connected to said common terminal, a second array of conductors each connected to a respective one of said second switch contact members, individual means actuated by each of said selectors for bridging the particular conductors of said first and second arrays corresponding to the digits established by said selectors, motor means, first means actuated by said motor means for causing said wiper member to scan sequentially said second switch contact members to successively connect tthe common terminal of said tuning circuits to the individual terminals thereof selected in accordance with the setting of said selectors, second means driven by said motor means for actuating said first switch to connect at least one of said tuning circuits to said potential source and disconnect said signal generator output means from said telephone line prior to the connection of said wiper member to an individual contact member of said second switch and for disconnecting said last named tuning circuit from said potential source and connecting said signal generator output means to said telephone line after said wiper member has been connected to said individual contact member of said second switch.

3. A preset telephone calling mechanism in accordance with claim 1 wherein each of said manually controlled selectors comprises a wheel rotatable on a fixed shaft and including an internal cam track, and said means actuated by said selector comprises a rod member having a cam follower secured to one end and a contact bridging member secured to the other end, said cam follower being disposed on said cam track in such manner as to impart to said contact bridging member, on rotation of said wheel, a degree of displacement corresponding to the digit established by said selector.

4. A preset telephone calling mechanism in accordance with claim 1 wherein said first array of conductors is disposed on one side of a circuit board in parallel configuration and said second array of conductors is disposed on the other side of said board in a parallel configuration normal to the conductors on said one side.

5. A preset telephone calling mechanism in accordance with claim 1 wherein each of said manually controlled selectors comprises a wheel rotatable on a fixed shaft and including an internal cam track, said first array of conductors is disposed on one side of a circuit board in parallel configuration and said second array of conductors is disposed on the other side of said board in a parallel configuration normal to the conductors on said one side, said means actuated by said selector comprises a rod member having a cam follower secured to one end and a contact bridging member secured to the other end, said contact bridging member comprising a pair of arms disposed in such manner as to straddle said circuit board, one of said arms making continuous contact with a conductor in said second array, and said cam follower is disposed on said cam track in such manner as to impart to said contact bridging member, on rotation of said wheel, the degree of displacement required to permit said other contact bridging arm to make contact with the one of said conductors in said first array corresponding to the digit established by said selector.

6. A preset telephone calling mechanism in accordance with claim 1 wherein said motor means comprises a segment gear connected to a pivoted arm member, said arm member being biased against rotation in one direction by a motor spring, pushbutton means for engaging said arm member to cause rotation thereof against the biasing action of said motor spring, a shaft member, a spur gear, a clutch means, said spur gear being connected to said shaft member through said clutch means and disposed in such manner as to engage said segment gear, said clutch means permitting rotation of said spur gear by said segment gear in one direction without rotation of said shaft member, and detent means normally engaging said shaft member, said detent means being actuated by said pushbutton means after the completion of rotation of said spur gear in said one direction to release said shaft member.

7. A preset telephone call transmitting system comprising a telephone line, a source of potential, a telephone set, said telephone set comprising a plurality of manually controlled selectors for establishing the digits of a telephone number to be called, a signal generator including output means, a capacitor and a tuning coil with individual taps for producing discrete signals, a first array of conductors individually connected to said coil taps, a first switch, a second switch comprising a wiper member and at least the same number of active contact members as the number of said selectors, said wiper member being connected to said capacitor, a second array of conductors individually connected to said second switch contact members, individual means actuated by each of said selectors for bridging the particular conductors of said first and second arrays corresponding to the digits established by said selectors, motor means, first means actuated by said motor means for causing said wiper member to scan sequentially said switch contact members to successively connect said capacitor across tapped portions of said coil selected in accordance with the setting of said selectors, second means driven by said motor means for actuating said first switch to connect said coil to said potential source and disconnect said signal generator output means from said telephone line prior to the connection of said capacitor across a tapped portion of said coil and for disconnecting said coil from said potential source and connecting said signal generator output means to said telephone line after said capacitor has been connected across said tapped portion of said coil.

References Cited in the file of this patent

UNITED STATES PATENTS

| | | |
|---|---|---|
| 2,594,300 | Dunlap et al. | Apr. 29, 1952 |
| 2,731,517 | Jeanne et al. | Jan. 17, 1956 |
| 2,799,729 | Lovell | July 16, 1957 |